Figure 4:
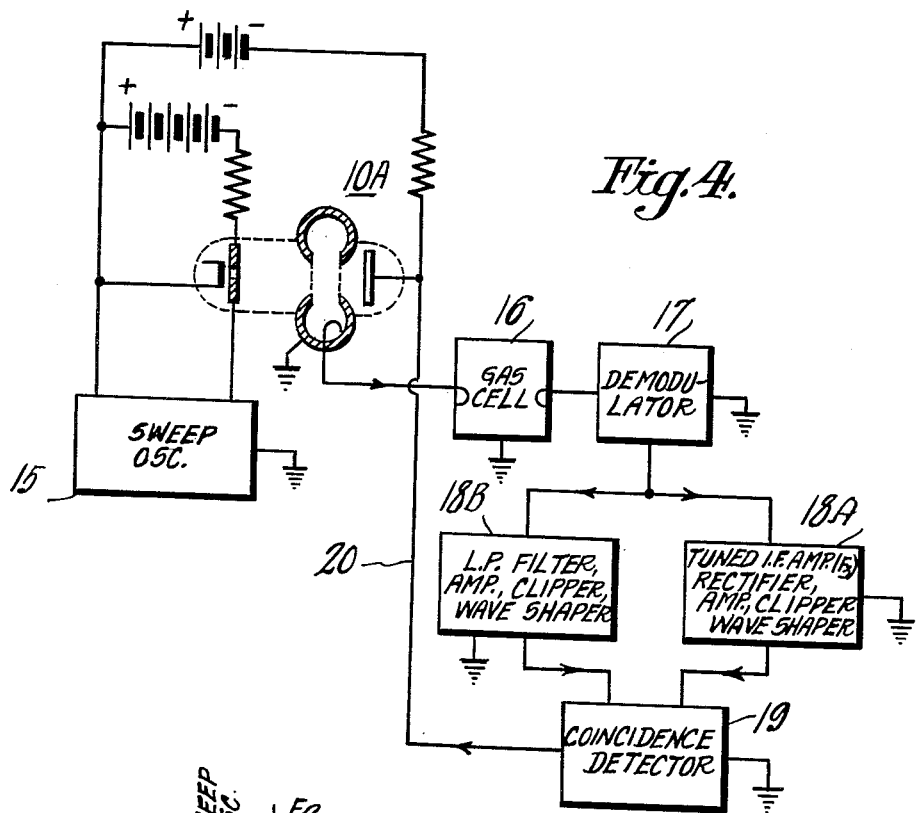

Aug. 2, 1955
L. E. NORTON
2,714,661
METHODS AND SYSTEMS FOR CONTROLLING THE
FREQUENCIES OF GENERATED OSCILLATIONS
Filed April 14, 1950
3 Sheets-Sheet 1
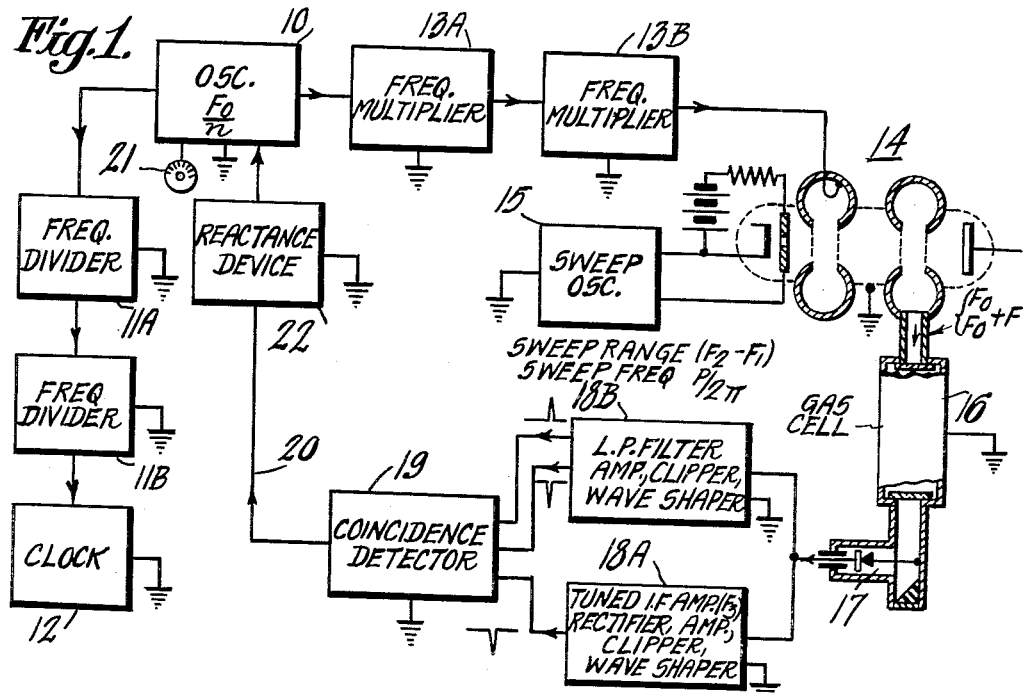
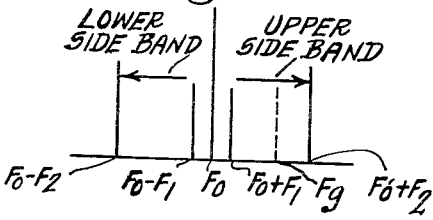
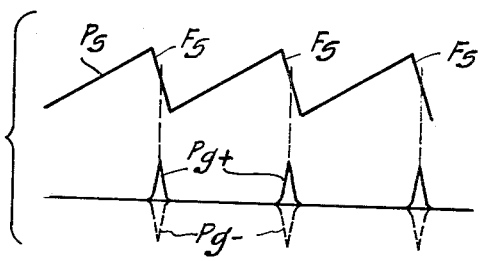
INVENTOR
*Lowell E. Norton*
BY
ATTORNEY Aug. 2, 1955

L. E. NORTON 2,714,661

METHODS AND SYSTEMS FOR CONTROLLING THE
FREQUENCIES OF GENERATED OSCILLATIONS

Filed April 14, 1950

3 Sheets-Sheet 2

INVENTOR
Lowell E. Norton
BY
ATTORNEY

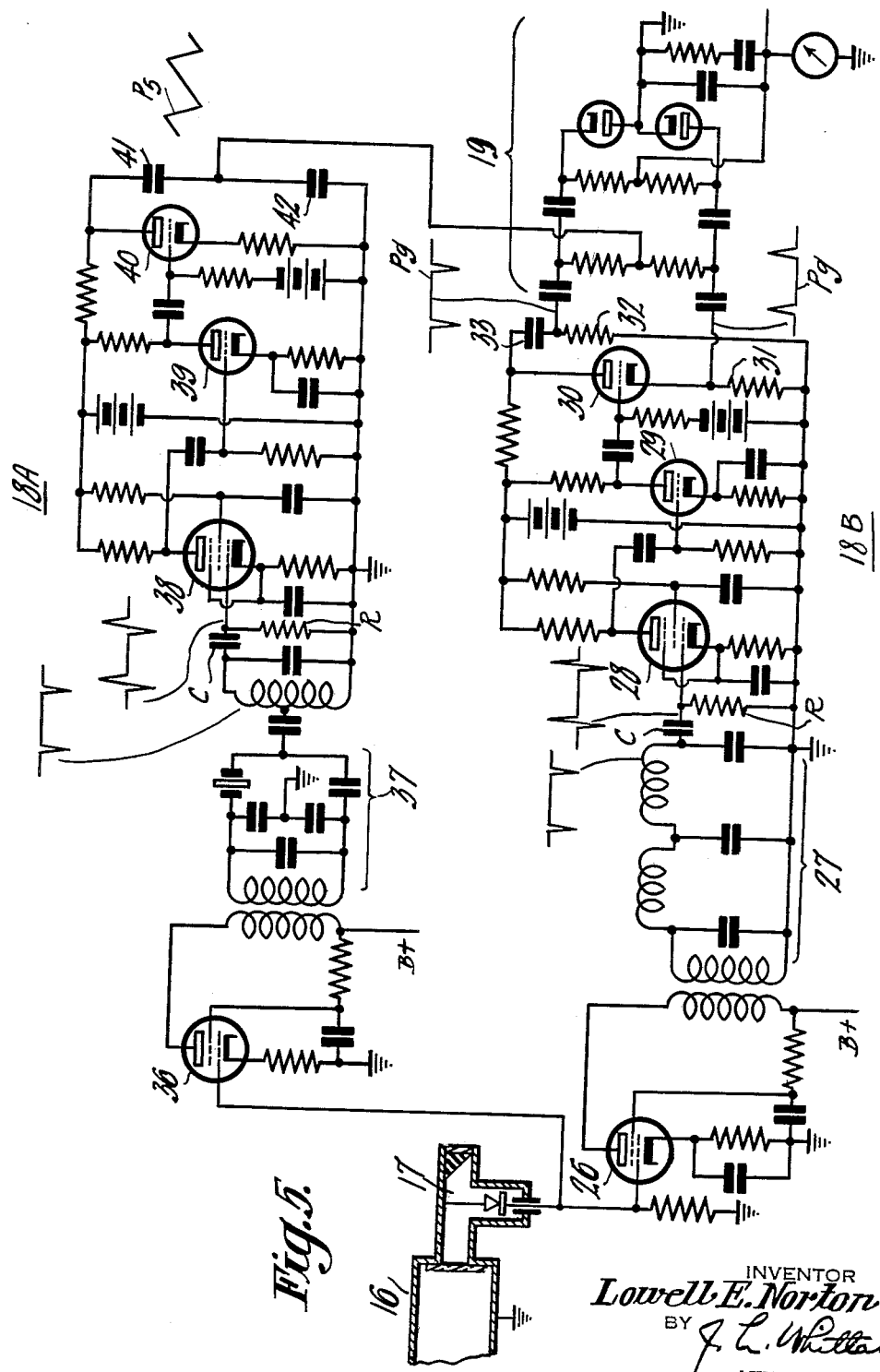

United States Patent Office 2,714,661
Patented Aug. 2, 1955

2,714,661

METHODS AND SYSTEMS FOR CONTROLLING THE FREQUENCIES OF GENERATED OSCILLATIONS

Lowell E. Norton, Princeton, N. J., assignor to Radio Corporation of America, a corporation of Delaware Application April 14, 1950, Serial No. 155,883

10 Claims. (Cl. 250—36)

This invention relates to methods and systems for controlling the frequency of microwave, or lower frequency, oscillations with precision suited for their use as a standard of frequency or time.

In accordance with the present invention, the oscillations are amplitude modulated by a frequency which is periodically varied to produce a side-band which periodically sweeps over a range of frequencies including a molecular resonance frequency of a gas or other sharply resonant standard. The energy passed by the standard is demodulated and its sweep-frequency component due to the amplitude-frequency characteristic of the gas absorption line, or other resonant standard is segregated from its modulation-frequency component. From the former is derived a series of pulses each corresponding with passage of the sweeping side-band through the frequency of the standard. A second series of pulses is produced by passing the periodically varying modulation component of the demodulated side-band energy in a path strongly favoring transmission of one prechosen modulation frequency. Upon any deviation of the frequency of the oscillations from a prechosen value, there is change, for successive sweep cycles, in the time relation between the two series of pulses and this change corresponds in sense and magnitude with the frequency deviation.

Further in accordance with the invention, the two series of pulses so derived may be utilized in a two-channel servo system to provide a control voltage utilized automatically to stabilize the frequency of the generated oscillations.

More specifically, in some forms of the invention, a sweep oscillator amplitude modulates the output of the last of a chain of frequency-multipliers or harmonic-amplifiers driven by a medium-frequency oscillator so that one of the modulation sidebands sweeps a range including a molecular resonance frequency of a gas serving as a frequency standard. The frequency-control voltage, derived as above briefly described, stabilizes the frequency of the medium-frequency oscillator which through frequency-dividers is utilized for operation of the primary time-standard, such as an electric clock.

In other and simpler forms of the invention, the stabilized oscillator is a microwave generator whose output is modulated by the sweep oscillator to produce a modulation side-band sweeping a range including a molecular resonance frequency of a gas standard.

For a more detailed understanding of the invention and for illustrations of systems utilizing it, reference is made to the accompanying drawings in which:

Fig. 1 is a block diagram of a stabilized oscillator system utilized as a time standard.

Figs. 2, 3A—3D are explanatory figures.

Fig. 4 schematically illustrates a stabilized microwave oscillator system;

Fig. 5 is a circuit diagram of components of the control systems of Figs. 1 and 4; and Fig. 6 is an explanatory figure referred to in discussion of the operation of Figs. 1, 4, and 5.

Referring to Fig. 1, the oscillator 10, when for utilization as a primary standard of time, may generate oscillations having a frequency of the order of 10 megacycles for example 7.95 megacycles. Oscillator 10 is followed by a frequency-multiplier chain 13A, 13B, and 14 for raising the frequency of the generated oscillations to within the micro-wave range. The frequency-multiplier 13A may comprise conventional stages, including triodes or pentodes, to raise the frequency to approximately 795 megacycles; the frequency-multiplier 13B may comprise several klystron stages serving as frequency-multipliers, or several stages of klystron-frequency multipliers and diode crystal multipliers. The final multiplier of the chain may be a klystron 14 whose output frequency is in the neighborhood of a gas absorption line. By way of example, the frequency $F_0$ of the output of the multiplier 14 may be 23,850 megacycles which is in the vicinity of the 3,3 absorption line of ammonia (23,870.1 mc.).

The microwave carrier output of the frequency multiplier 14 is amplitude modulated by an oscillator 15 whose frequency repeatedly varies at sweep frequency repetition $P/2\pi$ over a substantial range $F_2-F_1$ thus to produce two sweeping side-bands, one of which Fig. 2, covers a range of side-band frequencies including the molecular resonance frequency $F_g$ of gas confined at suitably low pressure in the cell 16. By way of example the range of the sweep oscillator 15 may be from 1 to 30 megacycles so that in each sweep cycle, assuming the frequency $F_0$ is at the desired value of 23,850 megacycles, there is produced an upper sideband which sweeps the range from 23,851 to 23,880 megacycles. At the same time, there is produced a lower side-band which sweeps the range from 23,849 megacycles to 23,820 megacycles.

The carrier and sideband output of the frequency multiplier 14—or at least the upper sweeping sideband— is impressed upon the gas cell 16 which in the example above stated contains ammonia exhibiting molecular resonance at frequency $F_g$ of 23,870.1 megacycles. Therefore, in each sweep cycle of oscillator 15, precisely when the upper sideband passes through 23,870.1 megacycles there is marked absorption by the gas of the upper side-band energy. The lower sweeping side-band encounters no absorption line or steep-amplitude-frequency characteristics and so contributes nothing to the alternating current output of the demodulator 17 following the gas cell 16.

Figure 3A:
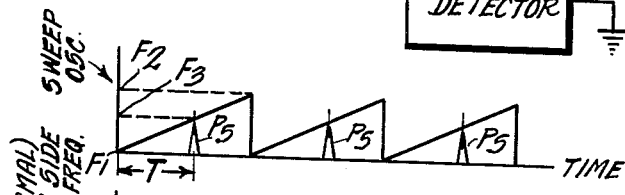
Figure 3B:
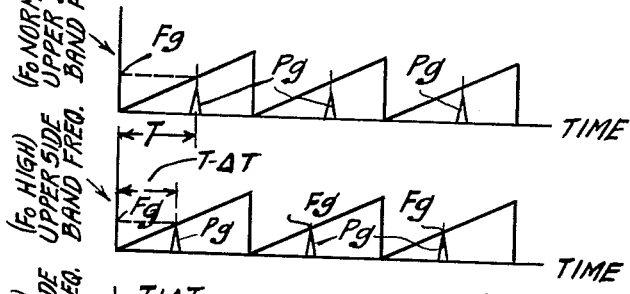
Figure 3C:
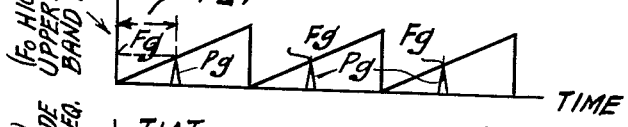
Figure 3D:
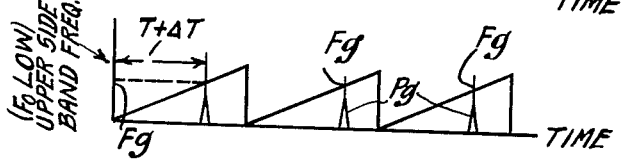

In each cycle of the sweep oscillator 15, that is at sweep repetition frequency $P/2\pi$, there is consequently a sharp change in the output of the demodulator 17 as the frequency of the upper side band passes through the molecular resonance frequency of the gas in cell 16. Specifically as shown in Fig. 3B, assuming the frequency of the generated oscillations is of the desired value (23,850 mc.), the upper side-band frequency passes through the gas line frequency $F_g$, after an interval T approximately equal to one-half of the period of the sweeping cycle for this particular illustrative example. If, however, the initial frequency of the generated oscillations is above normal, the upper side-band passes through the gas line frequency at an earlier time $T-\Delta t$, Fig. 3C, in each of the successive sweep cycles. On the contrary if the initial frequency of the generated oscillations is below normal, Fig. 3D, the upper sweeping side-band passes through the absorption line frequency $F_g$ at a later time in each sweep cycle represented by the interval $T+\Delta t$.

The output of the demodulator 17 also includes as a component the modulating frequency of the sweep oscillator which in the assumed example, varies from 1 to 30 megacycles in each sweep cycle.

The output of the demodulator 17, which may be a crystal diode is segregated into its two components, the sweep frequency component due to the amplitude frequency characteristic of the absorption line and the modulation frequency component for transmission in separate channels. The segregation may be effected by simple filtering.

One of the transmission paths or channels may include a tuned intermediate-frequency amplifier, rectifier, amplifier, clipper and wave-shaper generically represented by the block 18A. The tuned intermediate-frequency amplifier is resonant at a frequency $F_s$ which in the specific example under discussion is 20.1 megacycles. Thus in each sweep cycle of oscillator 15, there is produced a pulse as the modulation frequency of the demodulated side-band energy passes through 20.1 megacycles. This pulse $P_s$ occurs at the same time in each sweep cycle (Fig. 3A) and hence serves as a time reference.

The second transmission path for the sweep frequency component of the output of demodulator 17 may include a low-pass filter, amplifier, clipper, and wave-shaper generically represented by the block 18B. By this or equivalent means, there is produced in each sweep cycle, a pulse $P_g$ (Figs. 3B—3D) occurring as the upper sideband frequency passes through the gas absorption line. Assuming the frequency $F_0$ of the oscillations is equal to the algebraic difference or sum, respectively, of the gas line frequency $F_g$ and the pre-chosen frequency $F_s$ to which the I. F. amplifier is tuned, depending upon whether the upper sweeping sideband or lower sweeping sideband is used, the pulses of the two series occur at the same time in the successive sweep cycle (Fig. 3A, Fig. 3B). However, upon deviation of the frequency $F_0$ of the generated oscillation from such value, the pulses $P_g$ corresponding with the gas line absorption occur before (Fig. 3C), or after (Fig. 3D) the pulses $P_s$ corresponding with the chosen frequency $F_s$ of 20.1 megacycles. By applying the two series of pulses to a two-gun oscilloscope, for example, it can be at once determined whether the frequency $F_0$ of the generated oscillations is of the correct value or above or below that value and accordingly an operator by adjustment of a tuning control 21 of the oscillator 10 may maintain the oscillator at its proper frequency $$\frac{F_0}{n}$$

Preferably, however, the two series of pulses are utilized in a two-channel servo system automatically to stabilize the frequency of oscillator 10. Specifically the two series of pulses may be applied to the input circuits of a coincidence detector 19, a suitable form thereof is later herein specifically described and other forms of which are disclosed in copending applications including Serial Nos. 4497, 8246, 135,780, 115,698 so to produce a unidirectional control voltage of polarity and magnitude corresponding with the frequency deviation of oscillator 10. As schematically indicated in Fig. 1, this control voltage may be applied by line 20 to a reactance tube 22 effective to automatically stabilize the frequency of oscillator 10 in manner per se well known in the art—see for example, Fig. 4 of copending application Serial No. 26,802. Conventional count-down frequency dividers 11A and 11B of the Grosdoff decade type, for example, may be provided to reduce the stabilized frequency $$\frac{F_0}{n}$$

to a value sufficiently low to operate an electric clock 12 or other secondary time standard. For operation of a 60-cycle clock motor, the oscillator 10 frequency, if it is 7.95 mc./s., is reduced by a factor of 132,500 by the frequency-dividers.

It is, of course, to be understood that for a different frequency $$\frac{F_0}{n}$$

that the lower side-band may be used to sweep the gas- line absorption frequency: it shall also be understood that other absorption lines of ammonia may be used and that other gases exhibiting molecular resonance may provide the standard frequency $F_g$.

The arrangement disclosed in Fig. 1 differs from that of microwave frequency-control arrangements such as disclosed in aforesaid copending applications Serial Nos. 4497, 135,780, and 115,698 in that only a single klystron (instead of two) is necessary to provide for two-channel servo stabilization. It also differs from those arrangements in that the sweeping frequency is provided by producing frequency-sweeping, amplitude-modulation sidebands which produces a much more favorable situation than by changing the klystron cathode-reflector potential to produce sweeping of the gas line. In the latter and more usual method of sweeping, there are usually larger and more abrupt changes in amplitude over the sweep-frequency interval. In the method herein described, using sweeping amplitude-modulation side-bands, the variation in output amplitude over the range frequency corresponding with one sweeping side-band is much less and therefore the change in amplitude of the output of the demodulator 17 is due almost entirely to a loss in transmission at the line-absorption frequency $F_g$.

The arrangement is in some respect similar to that of the aforesaid copending applications in that for example, the coincidence detector provides a correction voltage which is zero when the oscillator frequency is of the correct value and which has sense and magnitude corresponding with an existing deviation of that frequency. However, with the present arrangement, the frequency-drift and sweep-linearity requirements on the sweeping oscillator are extremely non-critical for the following reasons: The sweeping side-bands which beat with the carrier and provide input to the tuned intermediate-frequency amplifier and the sweeping side-band which passes through the gas absorption line are due to the same sweeping oscillator so there can be no differential effects disturbing to the servo system. Also with the arrangements shown in Figs. 1 and 4 hereof there can be no ambiguity if the high-frequency output is on the wrong side of the gas-line frequency by an amount equal to the frequency $F_s$ because one value gives stable servo operation whereas the other is inherently unstable and does not result in oscillator stabilization at the wrong frequency. The stable and unstable conditions can only be reversed by reversing the polarity of the control voltage.

If instead of a low-frequency time standard, a high frequency standard is desired, the oscillator 10 and frequency-multiplier of Fig. 1 may be replaced by any high-frequency oscillator, such as the klystron 10A shown in Fig. 4. In such case, the error or correction-voltage output of the coincidence detector 19 is applied to a frequency-control element of the oscillator, as for example the reflector electrode in the case of a reflex klystron. If in a particular arrangement, the output signal is at high enough level to give a satisfactory signal-to-noise ratio, the sweeping side-bands can be produced in a final diode stage instead of by modulation in the klystron. In other respects, the system shown in Fig. 4 is similar to that of Fig. 1 and since the corresponding elements are identified by the same reference characters further explanation thereof appears unnecessary.

The segregation of the components of the output of the demodulator 17 which respectively contain the frequency-error information and the time-standard information may be effected by any of various filtering combinations per se known. A suitable arrangement for a two channel servo-system is disclosed in Fig. 5.

As there shown, the output of the demodulator 17 may in one channel (18B) be amplified by a tube 26 followed by a low-pass filter which excludes the sweeping modulation frequencies ($F_1$ to $F_2$) and passes the relatively low frequency gas absorption line envelopes at repetition frequency $P/2\pi$. This component of the side-band energy demodulated by rectifier 17 is in turn applied to the differentiation circuit RC attached to the grid circuit of tube 28 to provide a series of pulses $P_g$ each occurring as the upper side band (Fig. 2, 3B—3D) passes through the gas-line frequency $F_g$ in each sweep cycle. These pulses are clipped and amplified by tube 28. Output of tube 29, operating as a phase inverter and amplifier is applied to a wave-shaping circuit including the gas thyratron 30. From the resistor 32 of the anode circuit of tube 30, there is derived a series of negative pulses for application to the coincidence detector 19 and from the cathode resistor 31 of tube 30 is derived a series of positive pulses. In short, the channel 18A derives from one component of the output of the demodulator 17 oppositely poled pairs of pulses $P_g$, the pulses of each pair occurring as the upper side-band (Figs. 3B—3D) passes through the standard frequency $F_g$.

In channel 18B, the output of the demodulator 17 is amplified and subjected to the sharp, frequency-selective action of a tuned circuit or series of tuned circuits 37 which exclude the sweeping-frequency $P/2\pi$ and all of the modulation frequencies except the prechosen frequency $F_s$.

The pulses $P_s$ so derived from the output of the demodulator 17, one for each sweep cycle (Fig. 3A) are applied to differentiation circuit R. C., clipped and amplified by tube 38 and associated circuit components, phase inverted and amplified by tube 39 and associated components and then applied to a wave-shaping network comprising, in the particular arrangement shown, the tube 40 of a sawtooth wave-generator. The output circuit of tube 40 includes condensers 41, 42 in series for producing a sawtooth wave $P_s$ of frequency corresponding with the sweep frequency $P/2\pi$ of oscillator 16. The desired phase or time relation of the two series of pulses $P_g$, $P_s$ is shown in Fig. 6 and when such relation exists the error-voltage output of the coincidence detector 19 is zero. The pulses may be stabilized on either slope as shown in Fig. 6, or in Fig. 3, the latter being simpler to illustrate because of the smaller slope.

The particular form of coincidence or phase detector 19 shown in Fig. 5 comprises a pair of diodes 43, 44 with one of the direct-current (D. C.) output terminals 46, 47 of the coincidence detector connected to the lead connecting the cathode of one diode to the anode of the other. The time-reference pulses $P_s$ of the channel 18A are applied across a pair of resistors, 45, 45 of the detector network and the frequency-deviation signals of the channel 18B are applied to the midpoint of these resistors. The second D. C. output terminal 47 of the coincidence detector is the midpoint of a pair of resistors 48, 48 isolated, for direct current, from the channels 18A and 18B by the blocking condensers 49, 49. For a more specific discussion of this coincidence detector and for illustration of other suitable types, reference may be had to aforesaid copending applications. As therein explained, and also briefly above, the polarity or sense of the error voltage produced by the coincidence detector depends upon sense of the frequency deviation and is applied to correct it. Also, the magnitude of the error voltage is greater with increasing frequency deviation and hence is effective to minimize the frequency deviation.

It shall be understood the invention is not limited to the particular type of frequency selected network, amplifiers, clippers and wave-shaping networks shown in Fig. 5 and that other known equivalents thereof may be utilized without departure of the invention herein described and claimed. It shall also be understood that although the invention is particularly suited for utilization of a molecular resonant gas as a frequency-standard that it comprehends the utilization of other high-Q or sharply-resonant circuit elements as frequency standards particularly for stabilization at frequencies much lower than microwave frequencies.

What is claimed is:

1. A system for controlling the carrier-frequency of oscillators which comprises means for amplitude modulating the carrier to produce a side-band, means for periodically varying the modulating frequency to sweep a low-frequency range so to effect sweeping of a high-frequency range by said side-band, means for applying the sweeping side-band to a high-frequency standard within said high-frequency range, means for demodulating the side-band energy passed by said standard, the demodulated energy having a sweep-frequency component due to the amplitude-frequency characteristic of the frequency standard element and a modulation-frequency component, means for deriving from the sweep-frequency component a series of pulses each occurring as the side-band passes through said standard frequency, means for deriving from the modulation-frequency component a series of pulses each occurring as the carrier frequency and the side-band frequency differs by a prechosen value, and means for controlling the carrier frequency to maintain a fixed time relation between the corresponding pulses of the two series.

2. A system as defined in claim 1 in which said frequency control means includes means for producing a frequency control voltage of polarity and magnitude dependent upon the sense and extent of the deviation from a preselected time relation of the corresponding pulses of the two series.

3. A system as defined in claim 1 in which the carrier frequency is a microwave frequency and in which the high-frequency standard is a body of gas exhibiting sharp molecular resonance.

4. A system as defined in claim 3 in which the microwave carrier frequency is produced by multiplication of the frequency of a medium-frequency oscillator whose frequency is controlled to maintain the aforesaid time relation of the pulses.

5. A system for utilizing a gas exhibiting molecular resonance in control of the carrier frequency of microwave oscillations which comprises means for applying to the carrier a modulating frequency periodically sweeping through a range including a chosen fixed frequency to produce a microwave side-band periodically sweeping through a range including a molecular-resonance frequency of the gas, means for impressing the sweeping side-band upon a confined body of said gas for selected absorption of side-band energy as its frequency sweeps through said molecular-resonance frequency, means for demodulating the side-band energy unabsorbed by the gas, the demodulated energy having a sweep frequency component due to the gas absorption line and a modulating frequency component, means for segregating said sweep-frequency component to produce a series of pulses each corresponding with passage of the side-band frequency through said molecular resonance frequency of the gas, means for transmitting the modulating frequency component in a path favoring transmission of said fixed frequency to produce a second series of pulses, and means for maintaining a fixed time relation between the pulses of the two series.

6. In a system for controlling the carrier frequency of oscillations, means including a sweep oscillator for amplitude modulating the carrier over a range of frequencies at a sweep frequency to produce a high-frequency side-band periodically sweeping a range of high frequencies, selective circuit means upon which said side-band is impressed and exhibiting sharp resonance at a frequency within said high-frequency range, means for demodulating the side-band energy passed by said selective circuit means, two transmission channels upon which the output of said demodulating means is impressed, one of said channels favoring transmission of the sweep-frequency component of the output due to the amplitude-frequency characteristic of the selective circuit and the other favoring transmission of a fixed frequency within the sweep range of the oscillator, a phase-detector upon which the output of said channels are impressed to provide a control signal, and means for applying said control signal to control the frequency of said oscillations.

7. An arrangement as defined in claim 6 in which the selective circuit means is a cell confining a body of gas exhibiting molecular resonance at a microwave frequency, in which the fixed frequency is of the order of tens of megacycles and in which the sweep frequency is of much lower order than of said fixed frequency.

8. An arrangement as in claim 7 in which the output of the phase detector is applied to stabilize the frequency of an oscillator whose frequency is increased by a series of frequency multipliers to provide the carrier frequency modulated by the sweep oscillator.

9. A system for controlling the carrier-frequency of a microwave oscillator which comprises, means for amplitude-modulating said carrier to produce a side-band, means for periodically varying the modulating frequency to sweep a low-frequency range so to effect sweeping of a high-frequency range by said side-band, means for applying the sweeping side-band to a high-frequency standard within said high-frequency range, means for demodulating the side-band energy passed by said standard, the demodulated energy having a sweep-frequency component due to the amplitude-frequency characteristic of said standard and a modulation-frequency component, means for deriving from said sweep-frequency component a series of pulses each occurring as the side-band passes through said standard frequency, means for deriving from the modulation-frequency component a series of pulses each occurring as the carrier-frequency and the side-band frequency differ by a prechosen valve, means for combining said two series of pulses to produce a frequency control voltage of polarity and magnitude dependent upon the sense and extent of the deviation from a preselected time relation of the corresponding pulses of said two series, and means for applying said frequency control voltage to said microwave oscillator to stabilize its frequency.

10. In a system for controlling the carrier-frequency of a microwave oscillator, means including a sweep oscillator for amplitude-modulating the carrier over a range of frequencies at a sweep frequency to produce a high-frequency side-band periodically sweeping a range of high frequencies, a cell confining a body of gas exhibiting sharp molecular resonance at a frequency within said high-frequency range upon which said side-band is impressed, means for demodulating the side-band energy passed by said gas cell, two transmission channels upon which the output of said demodulating means is impressed, one of said channels favoring transmission of the sweep-frequency component of the output due to the amplitude-frequency characteristic of said gas cell and the other of said channels favoring transmission of a fixed frequency within the sweep range of said sweep oscillator, a phase detector upon which the outputs of said channels are impressed, and means for applying the output of said phase detector to said microwave oscillator to stabilize its frequency.

References Cited in the file of this patent
UNITED STATES PATENTS

| | | |
|---|---|---|
| 1,514,751 | Wold | Nov. 11, 1924 |
| 2,560,365 | Norton | July 10, 1951 |
| 2,609,654 | Hershberger | Sept. 9, 1952 |